(12) United States Patent
Gareau

(10) Patent No.: US 11,391,936 B2
(45) Date of Patent: Jul. 19, 2022

(54) LINE-SCANNING, SAMPLE-SCANNING, MULTIMODAL CONFOCAL MICROSCOPE

(71) Applicant: SURGIVANCE INC., New York, NY (US)

(72) Inventor: Daniel Summer Gareau, New York, NY (US)

(73) Assignee: SURGIVANCE INC., New York, NY (US)

(*) Notice: Subject to any disclaimer, the term of this patent is extended or adjusted under 35 U.S.C. 154(b) by 0 days.

(21) Appl. No.: 16/663,124

(22) Filed: Oct. 24, 2019

(65) Prior Publication Data

US 2020/0081238 A1  Mar. 12, 2020

Related U.S. Application Data

(63) Continuation of application No. 15/503,608, filed as application No. PCT/US2015/045121 on Aug. 13, 2015, now Pat. No. 10,466,460.

(Continued)

(51) Int. Cl.
*G03B 9/00* (2021.01)
*G02B 21/00* (2006.01)
(Continued)

(52) U.S. Cl.
CPC ....... *G02B 21/0084* (2013.01); *G02B 21/008* (2013.01); *G02B 21/0024* (2013.01);
(Continued)

(58) Field of Classification Search
CPC .............. G02B 21/0084; G02B 21/008; G02B 21/0064; G02B 21/0036; G02B 21/0076;
(Continued)

(56) References Cited

U.S. PATENT DOCUMENTS 3,232,165 A * 2/1966 Dupuy .................. G01N 21/45
356/521
3,590,255 A   6/1971 Smith, Jr. et al.
(Continued)

FOREIGN PATENT DOCUMENTS

JP   2006058105 A   3/2006
JP   2011112779 A   6/2011
(Continued)

OTHER PUBLICATIONS

Office Action issued in Chinese Patent Application No. 201580051488. 3, dated Oct. 9, 2018.
(Continued)

*Primary Examiner* — Philip P. Dang
(74) *Attorney, Agent, or Firm* — Ballard Spahr LLP; John A. Zurawski

(57) ABSTRACT

A confocal microscope is provided that includes one or more lasers focused by an optical system into a line on the surface of a sample mounted to a stage. The microscope further includes, at least one linear array detector that is optically conjugated to the focused line. The stage permits movement of the sample with respect to all other components of the microscope, which remain stationary.

17 Claims, 9 Drawing Sheets

Related U.S. Application Data

(60) Provisional application No. 62/037,030, filed on Aug. 13, 2014.

(51) Int. Cl.
  *G02B 21/26* (2006.01)
  *G02B 21/36* (2006.01)
  *G02B 26/04* (2006.01)

(52) U.S. Cl.
  CPC ..... *G02B 21/0032* (2013.01); *G02B 21/0036* (2013.01); *G02B 21/0064* (2013.01); *G02B 21/0076* (2013.01); *G02B 21/26* (2013.01); *G02B 21/368* (2013.01); *G02B 26/04* (2013.01)

(58) Field of Classification Search
  CPC ...... G02B 26/04; G02B 21/368; G02B 21/26; G02B 21/0032; G02B 21/0024
  See application file for complete search history.

(56) References Cited

U.S. PATENT DOCUMENTS

| | | | | |
|---|---|---|---|---|
| 4,401,618 | A * | 8/1983 | Salisbury | H05H 1/22 376/128 |
| 4,527,053 | A * | 7/1985 | Kinoshita | G02B 7/38 396/111 |
| 5,589,938 | A * | 12/1996 | Deck | G01B 9/0209 356/497 |
| 5,783,833 | A * | 7/1998 | Sugaya | G03F 7/70425 250/548 |
| 5,907,405 | A * | 5/1999 | Mizutani | G03F 7/70425 356/624 |
| 6,002,480 | A * | 12/1999 | Izatt | G01B 9/02072 356/479 |
| 6,088,083 | A * | 7/2000 | Meier | G02B 21/241 250/201.3 |
| 6,400,487 | B1 * | 6/2002 | Harris | G02B 21/0084 359/210.1 |
| 6,445,662 | B1 * | 9/2002 | Tonami | G11B 20/1426 369/124.05 |
| 6,460,997 | B1 * | 10/2002 | Frey | A61B 3/158 351/211 |
| 6,485,413 | B1 * | 11/2002 | Boppart | A61B 1/07 600/478 |
| 6,690,635 | B2 * | 2/2004 | Tonami | G11B 20/10 369/124.05 |
| 6,871,527 | B2 * | 3/2005 | Hansma | G01Q 20/02 850/50 |
| 6,982,431 | B2 * | 1/2006 | Modlin | G01N 21/6452 250/225 |
| 7,098,871 | B1 * | 8/2006 | Tegreene | G02B 27/01 345/7 |
| 7,217,573 | B1 * | 5/2007 | Oshida | G01N 21/6428 435/6.12 |
| 7,221,784 | B2 | 5/2007 | Olschewski | |
| 7,335,898 | B2 * | 2/2008 | Donders | G02B 21/0064 250/461.1 |
| 7,369,696 | B2 * | 5/2008 | Arini | G01N 21/6452 382/128 |
| 7,492,511 | B2 * | 2/2009 | Knebel | G02B 21/0032 250/201.3 |
| 7,508,583 | B2 * | 3/2009 | Scampini | G01N 35/04 422/65 |
| 7,554,725 | B2 * | 6/2009 | Stelzer | G02B 21/0076 359/398 |
| 7,615,758 | B2 | 11/2009 | Wang et al. | |
| 7,697,831 | B1 * | 4/2010 | Tsai | G03B 3/00 396/125 |
| 7,702,230 | B2 * | 4/2010 | Kijima | G03B 7/095 396/128 |
| 7,957,911 | B2 * | 6/2011 | Harris | G02B 21/0076 702/19 |
| 7,990,524 | B2 * | 8/2011 | Jureller | G02B 21/008 356/36 |
| 8,002,480 | B2 | 8/2011 | Polster et al. | |
| 8,497,476 | B2 * | 7/2013 | Hatakeyama | G01N 23/2251 250/311 |
| 8,542,438 | B2 | 9/2013 | Nakata et al. | |
| 8,547,533 | B2 * | 10/2013 | Knutson | C09B 23/086 436/139 |
| 8,598,535 | B2 * | 12/2013 | Miura | G01N 21/33 250/372 |
| 9,885,859 | B2 * | 2/2018 | Harris | G02B 21/367 |
| 10,265,647 | B2 * | 4/2019 | Friend | B81B 7/02 |
| 10,613,076 | B2 * | 4/2020 | Meller | G01N 27/49 |
| 2001/0041884 | A1 * | 11/2001 | Frey | A61F 9/00806 606/5 |
| 2003/0037616 | A1 * | 2/2003 | Vikhagen | G01B 9/02041 73/643 |
| 2004/0073120 | A1 * | 4/2004 | Motz | A61B 5/0084 600/478 |
| 2004/0233944 | A1 * | 11/2004 | Dantus | G01B 9/02014 372/25 |
| 2006/0033056 | A1 * | 2/2006 | Watkins | G01N 21/9501 250/559.19 |
| 2006/0103969 | A1 * | 5/2006 | Chu | G11B 5/59627 360/77.02 |
| 2007/0075216 | A1 * | 4/2007 | Tohma | G02B 21/244 250/201.3 |
| 2007/0109633 | A1 * | 5/2007 | Stelzer | G02B 21/0076 359/385 |
| 2007/0206203 | A1 * | 9/2007 | Trainer | G01N 15/0205 356/521 |
| 2009/0027558 | A1 * | 1/2009 | Mantiuk | H04N 9/67 348/E5.073 |
| 2010/0003189 | A1 * | 1/2010 | Tlsty | G01N 33/57492 424/9.4 |
| 2012/0003639 | A1 * | 1/2012 | Kerlikowske | C12Q 1/6883 435/7.1 |
| 2012/0235036 | A1 * | 9/2012 | Hatakeyama | H01J 37/073 250/310 |
| 2012/0287417 | A1 * | 11/2012 | Mimeault | G01C 3/08 356/5.01 |
| 2012/0312957 | A1 * | 12/2012 | Loney | G02B 21/0036 250/201.3 |
| 2013/0077086 | A1 * | 3/2013 | Chuang | G03F 1/84 372/5 |
| 2013/0313440 | A1 * | 11/2013 | Chuang | G02F 1/353 372/6 |
| 2013/0314717 | A1 * | 11/2013 | Yi | G01N 21/64 356/479 |
| 2014/0118730 | A1 * | 5/2014 | Kavaldjiev | H01L 27/1446 257/438 |
| 2014/0146325 | A1 * | 5/2014 | Tabuchi | G01B 11/24 356/609 |
| 2014/0151529 | A1 * | 6/2014 | Steiner | H01J 43/20 250/207 |
| 2014/0204196 | A1 * | 7/2014 | Loney | G02B 21/244 348/80 |
| 2015/0192461 | A1 * | 7/2015 | Chen | G02B 21/0052 356/366 |

FOREIGN PATENT DOCUMENTS

| | | |
|---|---|---|
| JP | 2013113650 A | 6/2013 |
| WO | 2013165576 A1 | 11/2013 |

OTHER PUBLICATIONS

Office Action issued in Japanese Patent Application No. 2017-528758, dated Jun. 25, 2019, with English translation.

* cited by examiner

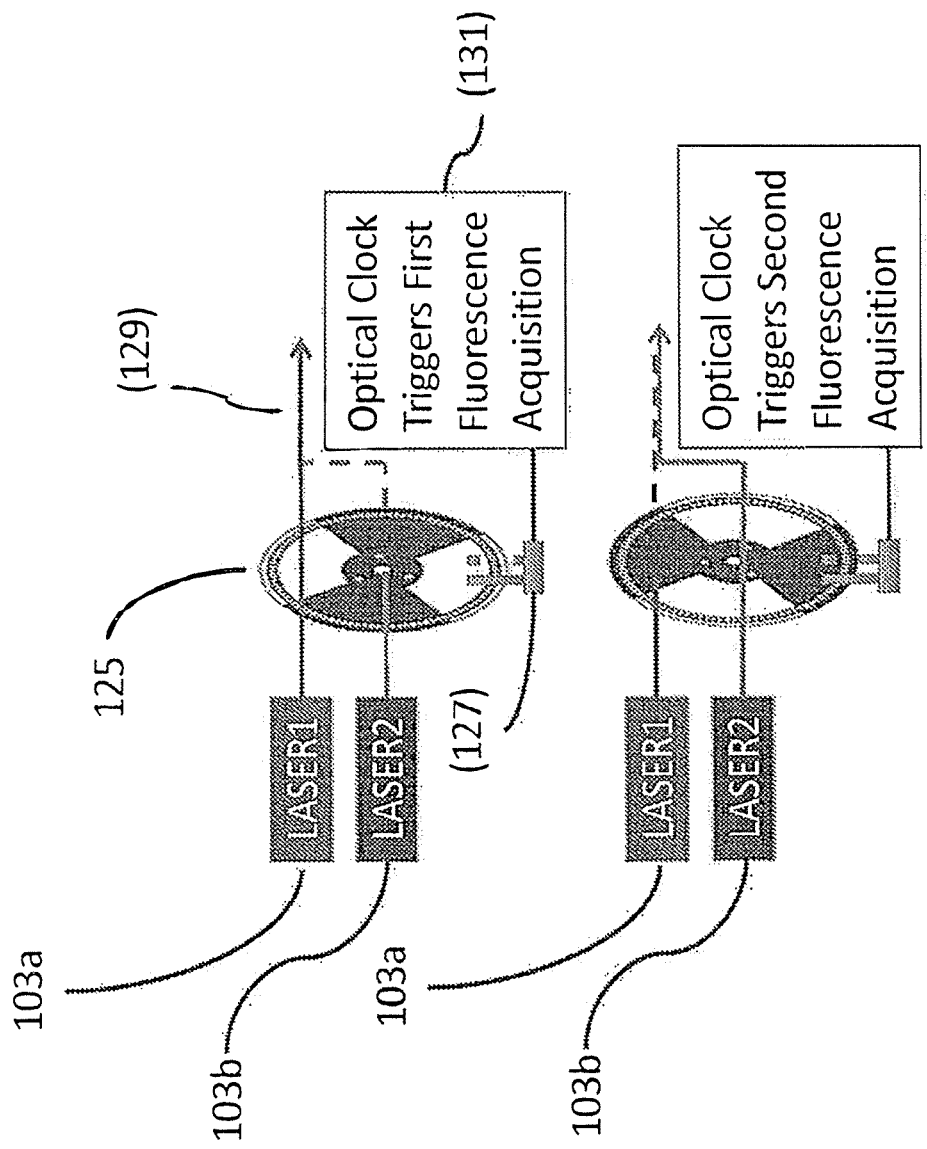

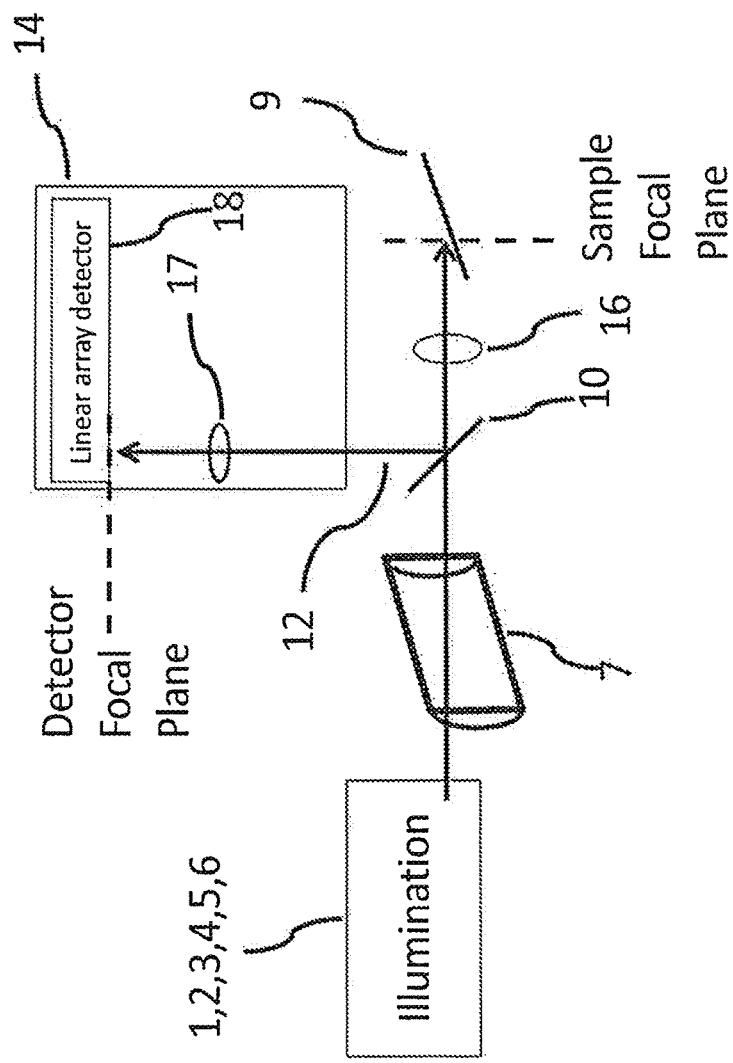

LINE-SCANNING, SAMPLE-SCANNING, MULTIMODAL CONFOCAL MICROSCOPE

CROSS-REFERENCE TO RELATED APPLICATIONS

This application is a continuation of U.S. patent application Ser. No. 15/503,608, filed Feb. 13, 2017, which is the 35 U.S.C. § 371 National Stage filing of PCT/US2015/45121, filed Aug. 13, 2015, which claims the benefit of priority of U.S. Provisional Application No. 62/037,030 filed on Aug. 13, 2014. The entire teachings of the above applications are incorporated herein by reference.

BACKGROUND

Cancer is the number two cause of death in the USA, killing about a half-million people per year. Early detection facilitates removal of primary tumors, which is critical to prevent metastasis by removal of primary tumors. The early growth phase is a vastly preferable detection window to the subsequent phase of metastatic initiation.

The ability to determine whether cancer exists in the body is generally limited by the ability to remove a sample of tissue and microscopically examine the tissue for the presence of cells that have known traits of cancer. This process is typically completed by slicing the tissue into thin sections in order to achieve resolution that is an order of magnitude smaller than cells, staining the sections with chemicals that label the cells and other tissue components, and placing the thin sections on a microscope for viewing and assessment.

Confocal microscopy is an alternative technique to image cells in tissues that does not require physically slicing tissue, also referred to as physical sectioning. Instead, confocal microscopy implements optical sectioning, different focal planes of the tissue are imaged in place of physical sectioning. Confocal microscopes probe a point within the tissue and scan the point in two dimensions to faun an image.

However, current techniques for imaging tissue by confocal microscopy are limited in certain respects. In one example, confocal microscopy fails to achieve a continuous image with both large field of view (e.g. greater than about 1 cm) and high resolution (e.g., less than about 5 μm). In another example, confocal microscopy fails to provide the information that is required to execute pathological analysis comparable to histopathology, which is the preeminent standard. In a further example, confocal microscopy is slow and cumbersome, preventing utility in surgical or perioperative theaters.

Accordingly, there exists a continued need for improved confocal microscopy systems and corresponding techniques.

SUMMARY

Embodiments of the present disclosure are directed to improved confocal microscope systems and analysis methods employing the same. In non-limiting embodiments, such systems may be employed as surgical bedside pathology devices for use in analysis methods that provide rapid determination of the presence or absence of cancer in biological tissue (e.g., human biological tissue).

As discussed in detail below, embodiments of the disclosed confocal microscopes include a light source (e.g., a coherent light source), a moveable stage that is adapted to receive a sample, a plurality of light detectors, and an optical system adapted to direct light from the light source to the sample and light from the sample to the plurality of linear array detectors.

For example, coherent light emitted by the light source (e.g., a laser) is received by the optical system and focused into a line (e.g., by a cylindrical lens of the optical system). This focused line of incident light is directed by the optical system upon a focal plane of interest of target sample secured to the stage. At least a portion of the incident light reflected from the focal plane of the sample, or emitted from the focal plane of the sample by fluorescence in response to the incident light, is received and focused by the optical system (e.g., an objective lens) onto the plurality of linear array detector, which measures the detected light as a function of time. The optical system may be further configured such that the path of the incident light prior to incidence upon the sample and path of the detected light reflected or fluorescently emitted from the sample follow different pathways.

The time-variant detected light properties change as the stage moves the sample with respect to the illuminated line, causing the line to strike and therefore probe different segments of the sample. The stage may be moved so as to direct the line across the sample, allowing optical measurements to be taken for the entire focal plane of interest. This process can be repeated for multiple focal planes to acquire optical measurements of the sample as a function of time and position. At least a portion of the optical, time, and position data may be further transmitted to a computing device in communication with confocal microscope that analyzes the data to generate three-dimensional images of the sample.

Embodiments of the disclosed confocal microscopes and corresponding analysis techniques represent a significant advancement. Notably, until recently, it has not been feasible to perform confocal microscopy using linear array detectors because the incident light intensity necessary to register a signal by the linear array detector would result in the thermal damage to the tissue or photo-bleaching the fluorescence molecules, in the case where the sample includes fluorescently labeled nuclei. However, linear array detectors have recently achieved sufficient sensitivity that makes them able to detect weak light signals from microscopic volumes of tissue.

Line-scanning samples with a confocal microscope and performing detection using a linear array detector provides significant advantages as compared to point-scanning confocal microscopes that perform detection using a two-dimensional (e.g., planar) raster scanning approach. In one aspect, line-scanning confocal microscopes are simpler and cheaper to fabricate because they do not require scanning in two independent directions in order to form a 2-dimensional image. Typical point-scanning microscopes will use a movable mirror (e.g., galvanometric mirror) such that a deflected laser beam can be angled into an objective lens with a variable angle which in turn varies the lateral position in the focal plane. The optoelectronics required to move the mirror and clock the motion are complex and the components, including the mirror its self which must be of "laser-quality," are expensive. In another aspect, line-scanning confocal microscopes are capable of forming an image more rapidly than the point scanning type because they add pixels to the image one line at a time instead of one pixel at a time. A typical linear array detector may have thousands of pixels that it can register simultaneously whereas a point detector only registers one at any given instant.

In an embodiment of the disclosure, a confocal microscope is provided. The microscope includes: a light source;

a stage adapted to secure a sample thereto; a plurality of linear array detectors; and an optical system. The optical system includes: a cylindrical lens positioned so as to receive a first light emitted by the light source and focus the first light in a line upon a selected plane of the sample when secured to the stage; and an objective lens positioned so as to receive a second light from the sample in response to incidence of the first light upon the sample and focus the second light upon at least one of the plurality of linear array detectors, where the stage is further adapted to position the sample at about the focal plane of the objective lens and to move the sample with respect to the focused line of the first light.

Embodiments of the confocal microscope may further include one or more of the following, in any combination.

In an embodiment of the confocal microscope, light source is a single laser source.

In an embodiment, the confocal microscope further includes an optical chopper and the light source includes at least two lasers, each emitting a different laser beam, where the optical chopper allows each different laser beam to pass on to the sample at a time different than the other laser beams.

In an embodiment, the confocal microscope further includes a clocking system that measures the position of the chopper, identifies the light source for which first light is permitted by the chopper to illuminate the sample, and measures the duration of that light source's illumination upon the sample.

In an embodiment of the confocal microscope, the clocking system includes a motion detector, a signaling light, and a clock detector positioned on both sides of the chopper, wherein the clock detector generates a clock signal in response to detection of the signaling light that corresponds to the duration of illumination of the identified light source upon the sample.

In an embodiment of the confocal microscope, the clocking system includes a motion detector and a clock detector positioned opposite the light source, wherein the clock detector generates a clock signal in response to detection of the illumination of the identified light source and wherein the clock signal corresponds to the duration of illumination of the identified light source upon the sample.

In an embodiment of the confocal microscope, the stage physically translates the sample with respect to the line of first light focused upon the sample without movement of the first light.

In an embodiment of the confocal microscope, the optical system further includes a first beam splitter positioned to reflect second light fluorescently emitted from the sample onto a first linear detector array of the plurality of linear detector arrays; and a second beam splitter positioned to reflect second light reflected from the sample onto a second linear detector array of the plurality of linear detector arrays.

In an embodiment of the confocal microscope, the second light fluorescently emitted from the sample possesses a wavelength different from that of the first light and wherein the second light reflected from the sample possesses a wavelength approximately the same as that of the first light.

In an embodiment of the confocal microscope, the path between the second light fluorescently emitted from the sample and the first linear detector array is different from the path between the second light reflected from the sample and the second linear detector array.

In an embodiment of the disclosure, a method of imaging a sample is provided. The method includes providing a confocal microscope including: a light source; a stage adapted to secure a sample thereto; a plurality of linear array detectors; and an optical system. The optical system includes: a cylindrical lens positioned so as to receive a first light emitted by the light source and focus the first light in a line upon a selected plane of the sample when secured to the stage; and an objective lens positioned so as to receive a second light from the sample in response to incidence of the first light upon the sample and focus the second light upon at least one of the plurality of linear array detector, where the stage is further adapted to position the sample at about the focal plane of the objective lens and to move the sample with respect to the focused line of the first light. Embodiments of the method further include positioning the stage at a first position, where the first light is focused in a line upon a first selected plane of the sample; measuring, by at least one of the plurality of linear array detectors, an intensity as a function of time for the second light focused upon the first selected focal plane of the sample; positioning the stage at second position, different from the first position, where the first light is focused in a line upon a second selected plane of the sample; and measuring, by at least one of the plurality of linear array detectors, an intensity as a function of time for the second light focused upon the second selected focal plane of the sample.

Embodiments of the method may further include one or more of the following, in any combination.

In an embodiment of the method, the first selected position is translated approximately perpendicular to the direction of the focused line of first light.

In an embodiment, the method further includes acquiring an optical image of the sample from a digital image capture device separate from the confocal microscope, the optical image having a field of view larger than the sample.

In an embodiment, the method further includes display of the optical image upon a display device in communication with a targeting computing device, the targeting computing device being adapted to receive vector targeting inputs from a user, wherein the vector targets correspond to a region of interest of the sample.

In an embodiment of the method, the targeting computing device is in communication with the stage and the stage is further adapted to: receive the vector targets from the targeting computing device and position the sample such that the first light is focused in a line within the region of interest of the sample.

BRIEF DESCRIPTION OF THE DRAWINGS

FIGS. 2a-2b are schematic illustrations of an illumination and clocking scheme employed in certain embodiments of the disclosed confocal microscope systems;

FIG. 5 is a schematic illustration of an optical configuration used in embodiments of the confocal microscope systems of the present disclosure;

DETAILED DESCRIPTION

Figure 1A:
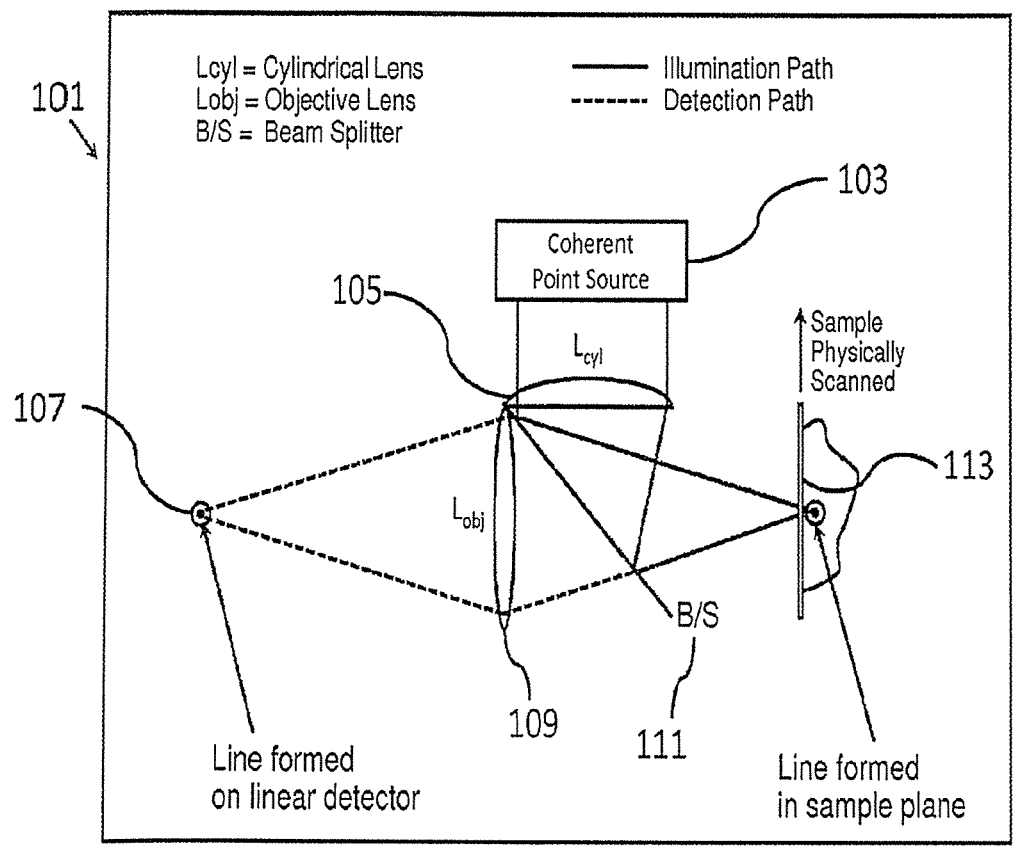
FIGS. 1a-1c are schematic illustrations of embodiments of confocal microscope systems of the present disclosure.
Figure 4A:
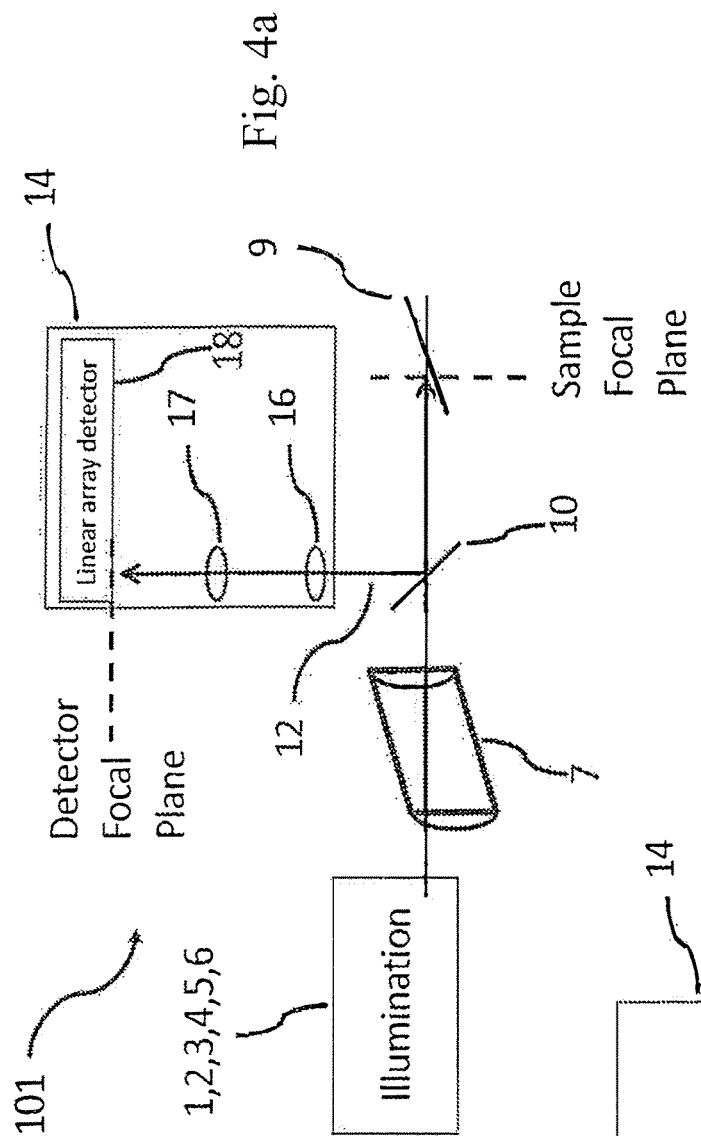
FIGS. 4a-4b are schematic illustrations of detection channels used in embodiments of the confocal microscope systems of the present disclosure.
Figure 4B:
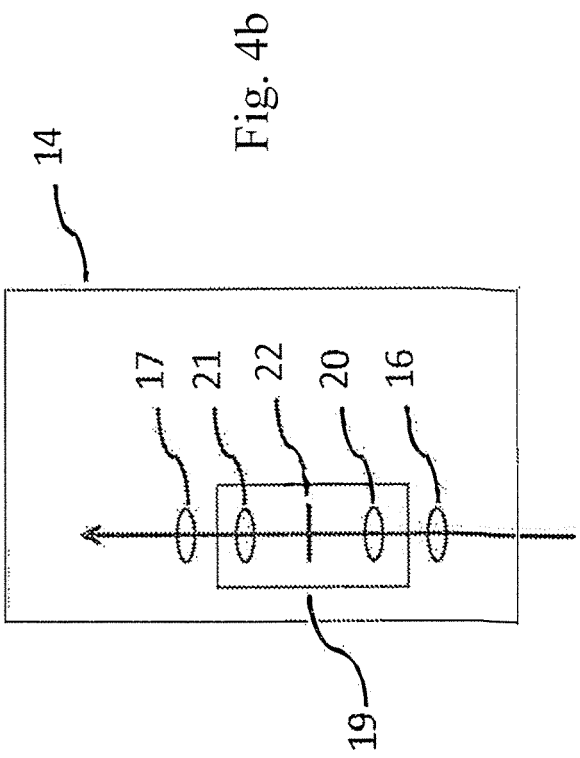

Embodiments of the disclosure will now be discussed with reference to the figures. FIG. 1a is schematic illustration of an embodiment of a confocal microscope (101) of the disclosure. The microscope (101) includes a light source (103), a cylindrical lens (105), a plurality of detectors (107), an objective lens (109), a beam splitter (111), and a stage (113). In FIG. 1a, lens systems are represented symbolically as single lenses (105) and (109) for clarity of description. However, subsequent figures, starting in FIGS. 4a-4b, the lenses and optical configurations are represented explicitly.

The light emanating from the light source (103) is focused as a line onto the plane of the sample with the cylindrical lens (105). This light may be referred to as "illuminating light" herein. Then, the illuminating light is reflected and/or fluorescently emanated backward from the sample. This light from the sample is split from the path of the incident beam (by beam splitter 111) toward the detector (107), which may include one or more linear array detectors. The detected light is conditioned by a conjugating optical system (109) that maps the focused line of incident light on the sample onto the one or more of the linear array detectors (107) in a conjugate focal plane or conjugate focal planes (in the case of multiple detectors). The stage (113) translates the sample (e.g., a tissue specimen) in space with respect to the optical system (e.g., 105, 109), allowing portions of the entire sample to be probed.

In certain embodiments of the disclosed confocal microscope (101) the line of incident laser light is focused onto, or within close proximity, of the surface of a window to which a sample (e.g., a tissue specimen) is placed and a separate optical path for imaging that plane to a conjugate focal plane containing a linear array detector is used. The use of the two separate paths for illumination and detection enables the conditioning of the two light beams independently (e.g. by putting the cylindrical lens (105) in the illumination path to create a line of focused light in the sample focal plane).

In further embodiments of the microscope (101), scanning of a tissue specimen (e.g., cancerous tissue) is performed by moving the stage to translate the sample (e.g., a tissue specimen) in space with respect to the apparatus that illuminates the sample with the line and images illuminated line at the detector plane. In one particular embodiment, no beam scanning (optical movement of the beam with respect to the microscope) is required.

Figure 1B:
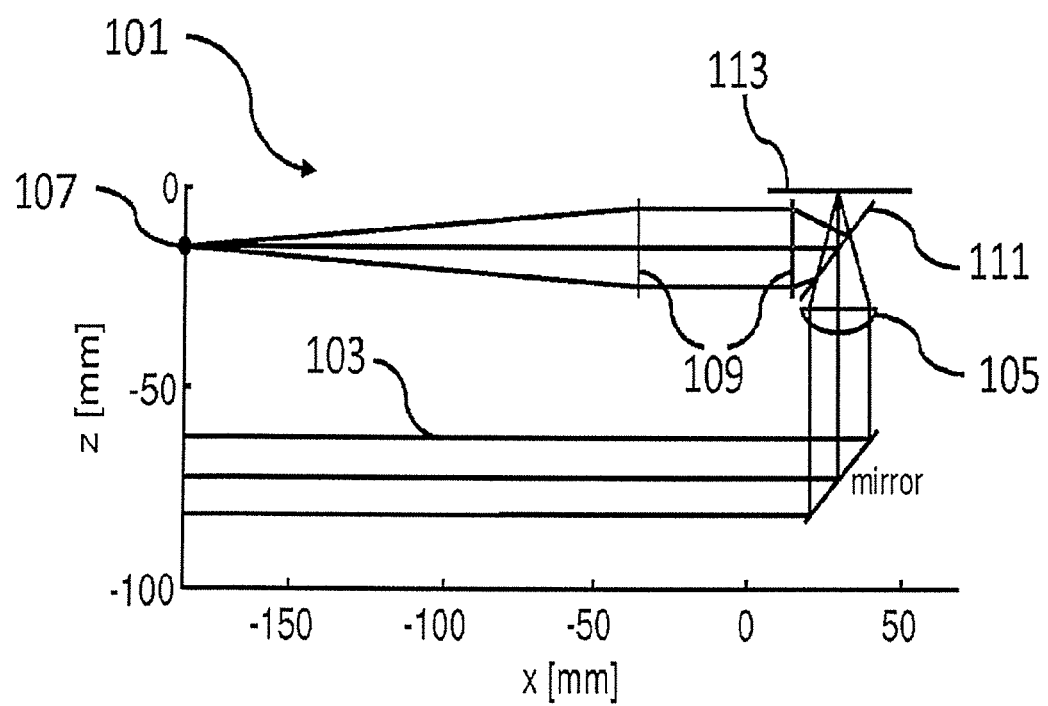

FIG. 1b presents another schematic illustration of an embodiment of the confocal microscope (101) in a fluorescence detection configuration for use in enabling imaging contrast from fluorescent nuclear stains. For example, the objective lens, $L_{obj}$ objective (109) is expanded into two lenses to illustrate that $L_{obj}$ is a lens system consisting of a compound lens and a detector lens that work together in order to condition the returning fluorescent and/or reflected light from the sample before the light hits the linear array detector(s).

FIG. 1b further illustrates a configuration in which the beam splitter (111) transmits the illuminating laser light and reflects the fluorescent emission light. As a result, the incident light is transmitted through the beam splitter (111) while fluorescent light emitted from the sample is reflected from the beam splitter to the detector (107), a linear fluorescence detector array.

Figure 1C:
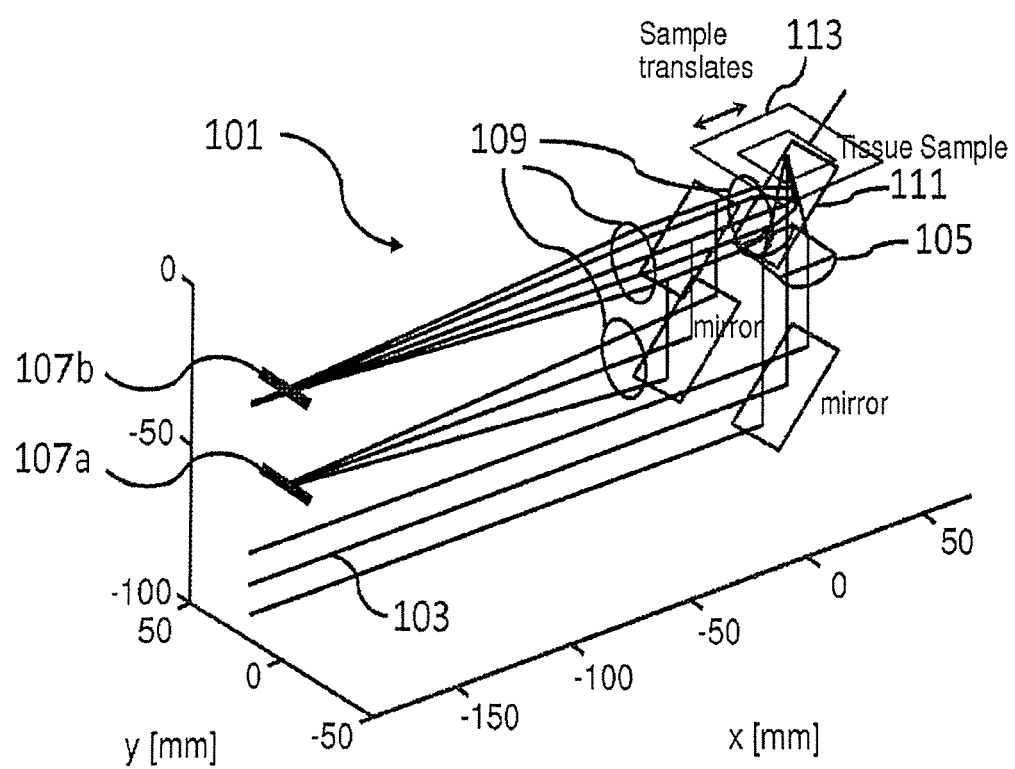

FIG. 1c presents a further schematic illustration of an embodiment of the confocal microscope (101) achieve multimodal imaging contrast, with the two modes being reflectance and fluorescence. The reflectance mode provides contrast to the tissue structure of the sample and fluorescence mode provides contrast to the cell nuclei of the sample. In this configuration, detected light is separated into reflected and fluorescent light paths that are detected by separate detectors (107a, 107b, respectively). It may be noted that the beam splitter (shown in FIGS. 1a-1c) can act to either reflect the illumination light (FIG. 1a) or reflect the detected light (FIG. 1b, FIG. 1c).

Embodiments of the microscope (101) represent a paradigm shift in confocal microscopy. In one aspect, conventional confocal microscopy acquires square fields of view with a point-scanning confocal configuration. In contrast, embodiments of the disclosed confocal microscope (101) implement line-scanning to overcome limitations in field of view at high resolution. This means that the line can be longer than the square field of view in predicate point-scanning systems.

In another aspect, conventional confocal microscopy employs a scanning laser beam, typically achieved by focusing the illuminating beam off a rotating mirror. In contrast, by employing a translating stage, rather than a scanning laser beam, there is no field curvature (which arises when scanning off a rotating mirror). In the current disclosure, the sample can be translated indefinitely (subject to the range of the motor driving the stage), extending the field of view in the direction perpendicular to the line to be larger than the square field of view of the predicate point-scanning systems. Thus, embodiments of the confocal microscope provide an unrestricted field of view in the direction of stage motion.

The advantage of eliminating illumination field curvature in the direction of stage scanning, as discussed above, is coupled with the advantage of the separate illumination and detection paths, which is that the field of view is also not limited by field curvature in the direction of the focused light line (approximately perpendicular to the direction of stage scanning). This results from the fact that the cylindrical lens has no curvature in its axis (the axis of the focused light line) and therefore can be extended in physical dimension to make a long line that is straight (i.e. not substantially curved) in space.

The absence of field curvature in the direction of the focused light line as well as absence of field curvature in the direction of the stage translation provides, within reasonable limits, a large field of view. For example, one can easily achieve a field of view of multiple centimeters with embodiments of the disclosed confocal microscope. In contrast, standard high-resolution microscopes are typically limited to fields of view that are less than 1 mm. This represents an improvement in field of view greater than 10×, which is highly beneficial when examining excised tissue specimens, which are generally larger than the field of view of 1 mm.

Embodiments of the light source (103) may be a coherent point source, such as a laser. In certain embodiments, the laser source is collimated. In alternative embodiments, the laser source is not collimated but divergent in the direction of curvature of the cylindrical lens (105) and the cylindrical lens may be omitted provided that the light is injected into the system so as to travel through the compound component of the objective lens system before striking the sample and therefore use the focusing power of the objective lens in the direction that the laser beam is not divergent. The important parameter of the laser in this case is that the divergence (in degrees) will determine the length of the line in the sample. Typical divergence factors of about 3 degrees are sufficient for the field of view of standard objective lenses but the line can be extended by using greater laser divergence.

Embodiments of the cylindrical lens (105) may a numerical aperture that, in combination with the wavelength of the illuminating light, yields a focused line small enough to resolve the important cellular and nuclear details of biological tissue such that the pathological status of said tissue can be determined. For example, the focused line may possess a thickness less than or equal to about 1μ.

Embodiments of the plurality of detectors (107) may include a pixel width in the direction perpendicular to the linear array, is approximately equal to the thickness of the focused line when projected into the detector focal plane. In this manner, confocal gating in the line-detection is achieved. The plurality of detectors may also be capable of line acquisition rates that are commensurate with the rate of travel of the stage (113). The sensitivity of the plurality of detectors (e.g., at least one of photoelectric sensitivity, electronic gain, and signal conditioning) provides a strong signal-to-noise ratio. For example, the signal to noise ratio of each of the plurality of detectors may be independently selected within the range between about 10 to about 100.

Embodiments of the objective lens (109) may include spherical lenses that are designed to have an approximately flat focal plane. In this case, keeping the numerical aperture high (and thereby maintaining good resolution) requires implementing large lenses. Accordingly, in certain embodiments, the objective lens may possess a diameter selected within the range between about 0.5 in to about 1.5 in. Alternative embodiments of the objective lens (109) may include special glass designs that yield an approximately flat conjugation of the region of the sample focal plane upon which the illumination line is incident onto the conjugate detector focal plane.

Figure 3:
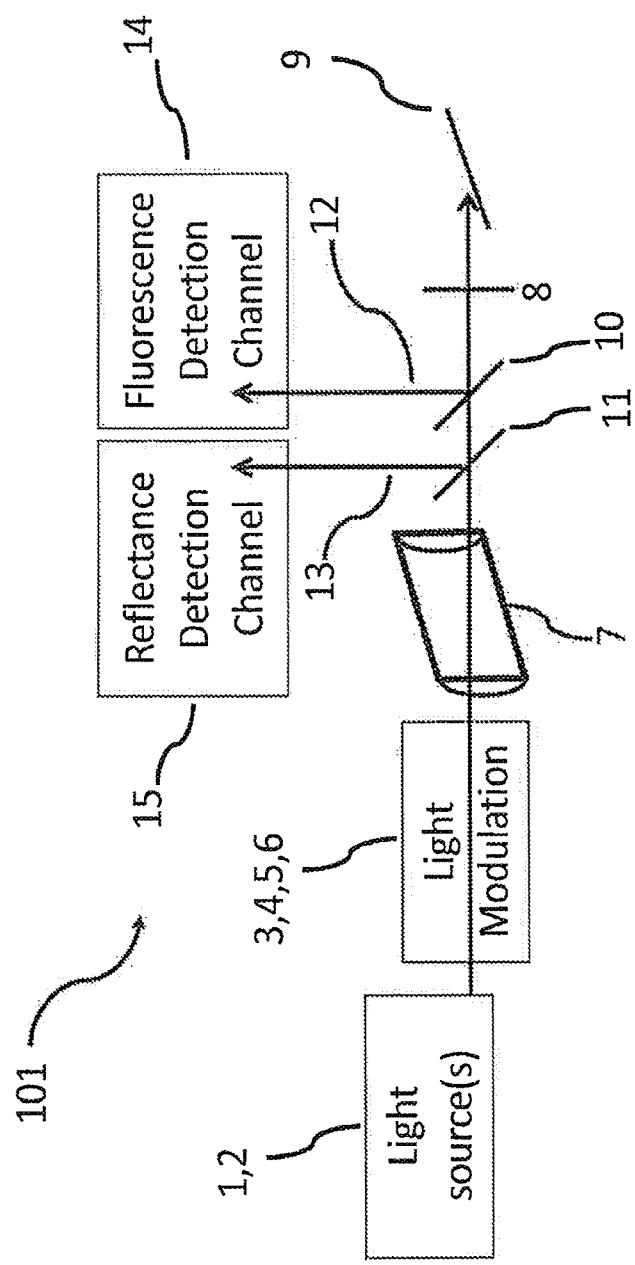
FIG. 3 is a schematic illustration of illumination and detection paths used in embodiments of the confocal microscope systems of the present disclosure.

Embodiments of the beam splitter (111) may include the implementation of a pellicle beam splitter which is an extremely thin membrane (e.g., about 3-5 μm). The advantage of using a thin beam splitter is that spherical aberrations are minimized. Embodiments of the beam splitter (111) may also include a plate beam splitter that is polarized (FIG. 3, element 11) for use to maximally reflect light in conjunction with a quarter wave plate (FIG. 3, element 8). Alternative embodiments include a chromatic beam splitter (10), also referred to as a dichroic beam splitter, to separate light of fluorescence emission wavelengths.

Embodiments of the stage (113) may possess one or more capabilities to facilitate imaging. In one aspect, the stage (113) possesses a minimum step size that is sufficiently small to resolve nuclear and cellular details (e.g., less than or equal to about 0.1 μm). In another aspect, the stage (113) possesses a positional repeatability that is sufficiently fine such that adjacent scans that are acquired sequentially may be stitched together seamlessly (i.e. without substantial registration error). In a further aspect, the stage (113) possesses tip and tilt adjustment to align the plane of an optical window (attached to the stage (113) and against which the sample is held) to the plane of focus of the objective lens to within about 1 μm of a desired value such that, when translating the stage over large lateral regions of the sample, the position of the optical window does not vary more than about 5 μm.

The discussion will now turn to FIGS. 2a-2b, which illustrate embodiments of the confocal microscope (101) that alternate the light source between two light sources (103a, 103b) emitting illuminating light of different wavelengths. In certain embodiments, the confocal microscope (101) further includes an optical chopper (125) that acts similar to the spinning blades of a fan. The function of the chopper (125) is to alternate which illuminating light is permitted to pass though the chopper and is focused as a line upon the sample.

Figure 7:
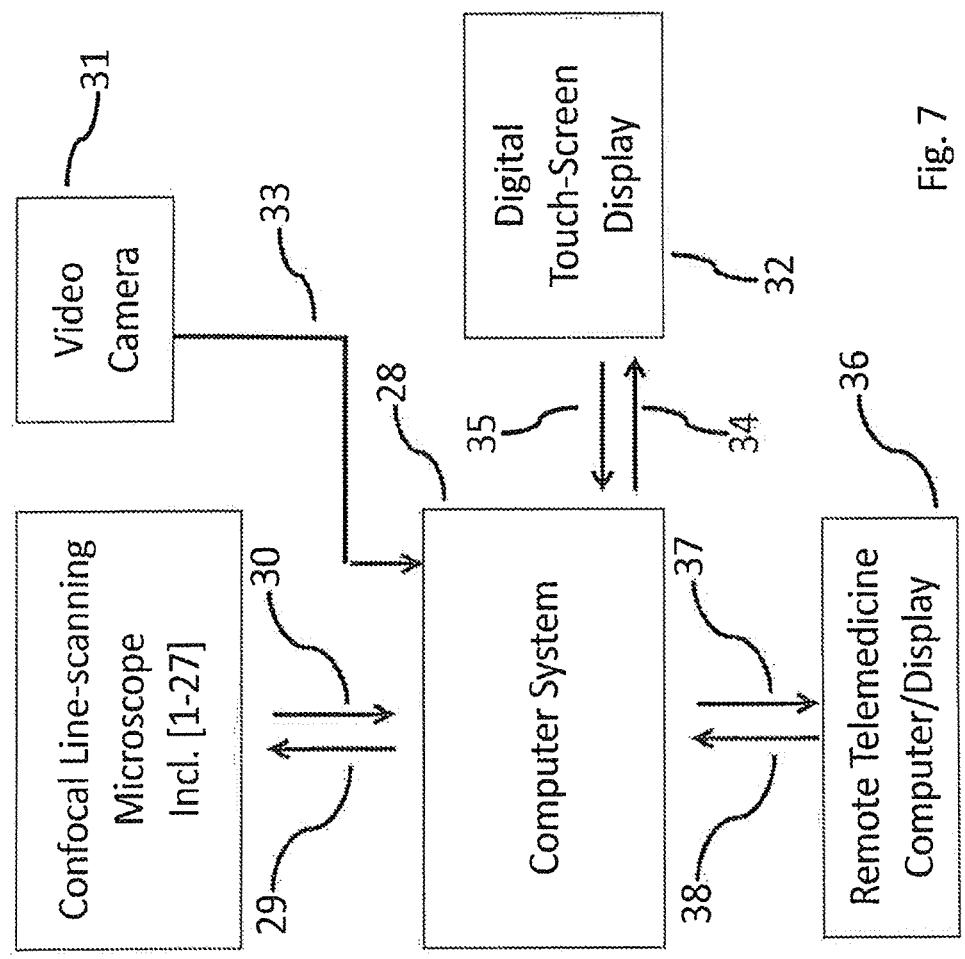
FIG. 7 is a schematic block diagram illustrating a clinical microscope design incorporating embodiments of the confocal microscope systems of the present disclosure.

In an embodiment, a motion detector (127) with a signaling light (broken line) and a clock detector (solid line) is positioned on both sides of the chopper fan and generates a clock signal which is used to indicate the periods of illumination by the separate lasers 103a, 103b. In alternative embodiments, the clocking signal may be obtained by omitting the light source in the motion detector and instead, detecting a small portion of one or both laser beams. This configuration of the confocal microscope results in output of illuminating light that alternates in source (i.e., between the two lasers) and thus wavelength, as well as a clocking signal (131) that is used to time the acquisition. In this manner, separate line measurements can be obtained by the linear array detectors under the separate laser wavelength illuminations and the movement of the sample-holding stage may be timed such that, after all the laser illuminations are achieved, the sample moves to a new position and the process repeats. In certain embodiments clock signal (131) goes directly to the linear array detector(s) (18) (see FIGS. 4, 5) while in other embodiments, the clock signal (131) goes to a computer (28) (see FIG. 7) which in turn triggers the linear array detector(s) (18) to acquire measurements of light incident thereupon.

In certain embodiments (see e.g., FIG. 3) the confocal microscope includes a cylindrical lens [7] that focuses the light from the light source (e.g., [1], [2]) through a quarter-wave plate [8] onto the sample in a line [9]. On the return path, where light is emanating from the sample back towards the optical system, a first beam splitter [10] is positioned to reflect the fluorescent light emission at about 90 degrees with respect to the laser light illumination. Similarly, a polarizing beam splitter [11] is positioned to reflect the laser light scattered when the line illuminates the tissue at about 90 degrees with respect to the laser light illumination. The two reflecting beam splitters direct the light emanating from the sample, both fluorescent [12] and reflected [13] towards two detection channels: a fluorescence detection channel [14] (e.g., a first linear array detector) and a reflectance detection channel [15] (e.g., a second linear array detector).

In certain embodiments, where it is disadvantageous to place a quarter-wave plate [8] in the optical path, the quarter-wave plate [8] is omitted and the polarizing beam splitter [11] is replaced with a 50/50 beam/splitter.

In certain embodiments, the confocal microscope (see e.g., FIGS. 4a-4b) further includes an infinity-corrected objective lens [16] for optical detection. The lens [16] is positioned so as to focus to a plane that contains the illuminated line in the sample focal plane [9] such that the sum of the distance between the objective lens [16] and the beam splitter [10] and the distance between the beam splitter [10] and the line illumination [9] is approximately equal to the focal length of the objective lens [16]. It should be noted that the in terms of spacing, the term "objective lens" in these embodiments refers to the theoretical plane of the thin-lens equivalent of the objective lens, which may be a multi-lens compound optic.

A detector lens [17] is placed at a distance from the objective lens that is the sum of the objective lens' [16] focal length and the detector lens' [17] focal lengths. A linear array detector [18] is placed in the focal plane of the detector lens (i.e. at a distance from the detector lens that is about the focal length of the detector lens). Fluorescence detection by the fluorescence detection channel [14] follows the scheme for optical detection by the reflectance channel [15].

In certain embodiments, an extra telescope [19] may optionally be inserted between the lenses [16, 17] to adjust the magnification of the conjugation of the illuminated line [9] onto the linear array detector [18], enable the addition of additional light conditioning optics [22], or simply elongate the optical system for convenience. The placement of the lenses [16, 17] is such that (for instance in this example) the distance between lens [21] and lens [17] is the sum of the focal lengths of the two lenses [21, 17], the distance between lens [20] and lens [21] is the sum of the focal lengths of the two lenses [20, 21] and the distance between lens [20] and lens [16] is the sum of the focal lengths of the two lenses [20, 16]. Additional telescopes [22] may be added in a similar manner to indefinitely modify the confocal microscope (101).

In certain embodiments (See e.g., FIG. 5), the position of the objective lens [16] is adjusted such that the laser light is focused by the cylindrical lens [7] onto the back focal plane of the objective lens [16].

In certain embodiments, the laser source is not collimated but divergent in the direction of curvature of the cylindrical lens [7] and the cylindrical lens [7] may be completely omitted.

Figure 6:
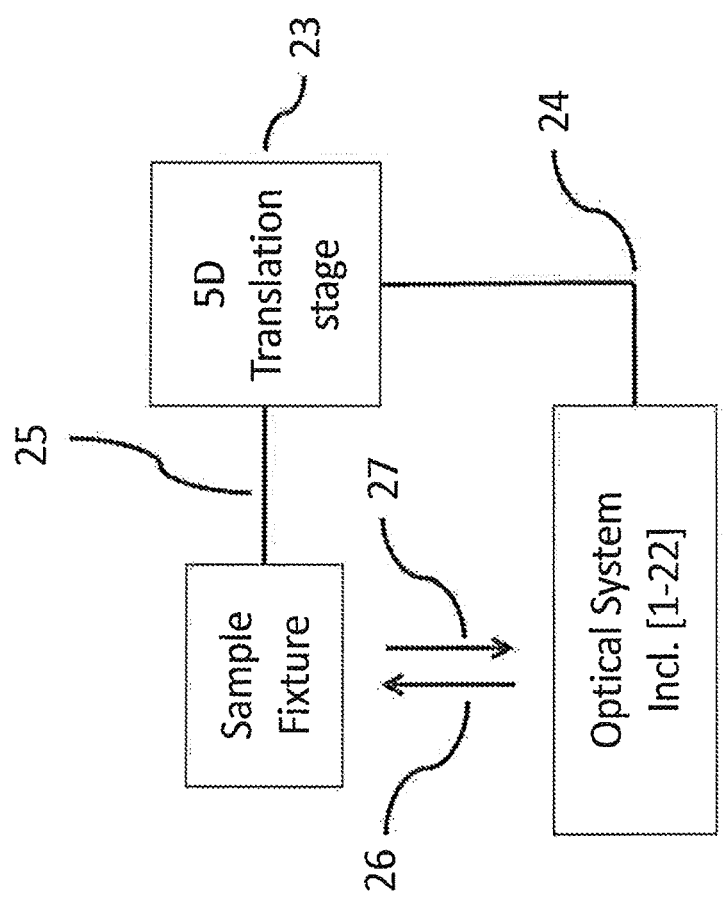
FIG. 6 is a schematic block diagram of a sample-scanning scheme used in embodiments of the confocal microscope systems of the present disclosure.

In certain embodiments, the device disclosed herein contains no moving optical beams. Instead the sample is tipped, tilted and translated with respect to the optical system. The translation is required for forming an image and the tip/tilt is required for parallelizing the surface of the sample with the focal plane of the objective lens. The translation scheme (See e.g., FIG. 6) includes of a 5-dimensional micro-positioning unit [23] that is rigidly coupled [24] to the optical system and that controls the x-, y- and z-positions of the sample as well as the tip and tilt of the sample with respect to the plane perpendicular to the optical illumination path [26] and detection path [27].

In certain embodiments, a sample fixture, which contains the specimen to be imaged, is mechanically coupled in an adjustable way [25] to the micro-positioning unit [23]. The tip, tilt and z micro-manipulation can be used to position the sample such that its surface is in the focal plane of the objective lens [16]. They micromanipulator moves the sample perpendicular to the illuminated line [9] in the focal plane of the objective lens [16] while the linear array detector [14] acquires a series of lines that are assembled to form a planar field of view. The y micromanipulator moves the sample in the direction of the illuminated line such that after a field of view is acquired, a subsequent field of view or fields of view can be acquired to cover additional portions of the sample surface. The z micromanipulator can be used to acquire stacks of planes to form 3D images.

In certain embodiments, the image data obtained may be processed and/or displayed by one or more computer processors [28, 36, etc.], and the processed data [34, 37], a diagnosis or an indicator of the presence of absence of skin disease [38] may be output to and displayed by one or more display modules. In certain embodiments, there is a digital display [32], optimized for the surgical setting and a telemedicine modality [36] such that the microscopic image can be reviewed in real-time by expert pathologist(s). The confocal microscope (see e.g., FIG. 7) generally comprises the confocal microscope that is connected by a computer processor [28] with communications from the computer to the microscope [29] such as commands to drive the micro-positioning translational stage [23], a trigger to acquire data on the linear array detector(s) [18], signals to turn on/off the lasers [1,2] and chopper [3] and also communications from the microscope to the computer [30] such as the clock signal from the chopper [6], image data from the linear array detector(s) [18].

In certain embodiments, a conventional digital camera [31] images the sample and the live video feed [33] is sent to the computer processor [28], which in turn feeds the image in a data stream [34] on the digital touch-screen display [32] such that the operator can select by manual touch or mouse clicks the region coordinates of desired confocal scanning. This user selected coordinate information is relayed to the computer [35] to be used for control of the confocal image acquisition.

In certain embodiments, during confocal image scanning, one or more confocal images are acquired, assembled by potentially being merged, and sent as a signal [34] to the clinical display monitor [32] for display.

In certain embodiments, a remote telepathology computer processor with display [36] receives image data [37] and can be used to transmit a diagnosis or an indicator of the presence of absence of skin disease or a modified image where a region of interest on the images specimen is indicated [38].

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every formulation or combination of components described or exemplified herein can be used to practice the invention, unless otherwise stated.

Whenever a range is given in the specification, for example, a temperature range, a time range, or a composition, component or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A confocal microscope comprising:
 a light source;
 a stage adapted to secure a sample thereto;
 a plurality of linear array detectors; and
 an optical system comprising:
  a cylindrical lens positioned so as to receive a first light emitted by the light source and focus the first light in a line upon a selected plane of the sample when secured to the stage; and
  an objective lens positioned so as to receive a second light from the sample in response to incidence of the first light upon the sample and focus the second light upon at least one of the plurality of linear array detectors;
 wherein the stage is further adapted to position the sample at about a focal plane of the objective lens and to move the sample with respect to the focused line of the first light, wherein, upon positioning the stage at a first position, the first light is focused in a line upon a first selected plane of the sample to allow measurement, by at least one of the plurality of linear array detectors, an intensity as a function of time for the second light focused upon a first selected focal plane of the sample;
 wherein, upon positioning the stage at a second position, different from the first position, the first light is focused in a line upon a second selected line of the sample to allow measurement, by at least one of the plurality of linear array detectors, an intensity as a function of time for the second light focused upon a second selected focal line of the sample;

wherein the confocal microscope further comprises:
an optical chopper, wherein the light source comprises at least two lasers, each emitting a different laser beam, and wherein the optical chopper allows each different laser beam to pass on to the sample at a time different than other laser beams; and a clocking system that measures a position of the optical chopper, identifies the light source for which the first light is permitted by the optical chopper to illuminate the sample, and measures a duration of that light source's illumination upon the sample, wherein the clocking system comprises a motion detector, a signaling light, and a clock detector positioned on both sides of the optical chopper, wherein the clock detector generates a clock signal in response to detection of the signaling light that corresponds to the duration of illumination of the identified light source upon the sample.

2. The confocal microscope of claim 1, wherein the light source comprises a single laser source.

3. A confocal microscope comprising:
a light source;
a stage adapted to secure a sample thereto;
a plurality of linear array detectors; and
an optical system comprising:
a cylindrical lens positioned so as to receive a first light emitted by the light source and focus the first light in a line upon a selected plane of the sample when secured to the stage; and
an objective lens positioned so as to receive a second light from the sample in response to incidence of the first light upon the sample and focus the second light upon at least one of the plurality of linear array detectors;

wherein the stage is further adapted to position the sample at about a focal plane of the objective lens and to move the sample with respect to the focused line of the first light, wherein, upon positioning the stage at a first position, the first light is focused in a line upon a first selected plane of the sample to allow measurement, by at least one of the plurality of linear array detectors, an intensity as a function of time for the second light focused upon a first selected focal plane of the sample;

wherein, upon positioning the stage at a second position, different from the first position, the first light is focused in a line upon a second selected line of the sample to allow measurement, by at least one of the plurality of linear array detectors, an intensity as a function of time for the second light focused upon a second selected focal line of the sample;

wherein the confocal microscope further comprises:
an optical chopper, wherein the light source comprises at least two lasers, each emitting a different laser beam, and wherein the optical chopper allows each different laser beam to pass on to the sample at a time different than other laser beams; and a clocking system that measures a position of the optical chopper, identifies the light source for which the first light is permitted by the optical chopper to illuminate the sample, and measures a duration of that light source's illumination upon the sample, wherein the clocking system comprises a motion detector and a clock detector positioned opposite the light source, wherein the clock detector generates a clock signal in response to detection of the illumination of the identified light source and wherein the clock signal corresponds to the duration of illumination of the identified light source upon the sample.

4. The confocal microscope of claim 1, wherein the stage physically translates the sample with respect to the line of first light focused upon the sample without movement of the first light.

5. The confocal microscope of claim 1, wherein the optical system further comprises:
a first beam splitter positioned to reflect the second light fluorescently emitted from the sample onto a first linear detector array of the plurality of linear detector arrays; and a second beam splitter positioned to reflect second light reflected from the sample onto a second linear detector array of the plurality of linear detector arrays.

6. The confocal microscope of claim 5, wherein the second light fluorescently emitted from the sample possesses a wavelength different from that of the first light and wherein the second light reflected from the sample possesses a wavelength of the first light.

7. The confocal microscope of claim 5, wherein a path between the second light fluorescently emitted from the sample and the first linear detector array is different from a path between the second light reflected from the sample and the second linear detector array.

8. A method of imaging a sample, comprising:
providing a confocal microscope comprising:
a light source;
a stage adapted to secure a sample thereto;
a plurality of linear array detectors; and
an optical system comprising:
a cylindrical lens positioned so as to receive a first light emitted by the light source and focus the first light in a line upon a selected plane of the sample when secured to the stage;
an objective lens positioned so as to receive a second light from the sample in response to incidence of the first light upon the sample and focus the second light upon at least one of the plurality of linear array detectors;
an optical chopper, wherein the light source comprises at least two lasers, each emitting a different laser beam, and wherein the optical chopper allows each different laser beam to pass on to the sample at a time different than other laser beams; and
a clocking system that measures a position of the optical chopper, identifies the light source for which the first light is permitted by the optical chopper to illuminate the sample, and measures a duration of that light source's illumination upon the sample, wherein the clocking system comprises:
a motion detector, a signaling light, and a clock detector positioned on both sides of the optical chopper, wherein the clock detector generates a clock signal in response to detection of the signaling light that corresponds to the duration of illumination of the identified light source upon the sample; or a motion detector and a clock detector positioned opposite the light source, wherein the clock detector generates a clock signal in response to detection of the illumination of the identified light source and wherein the clock signal corresponds to the duration of illumination of the identified light source upon the sample;

wherein the stage is further adapted to position the sample at about a focal plane of the objective lens and to move the sample with respect to the focused line of the first light;

positioning the stage at a first position, wherein the first light is focused in a line upon a first selected plane of the sample;

measuring, by at least one of the plurality of linear array detectors, an intensity as a function of time for the second light focused upon a first selected focal plane of the sample;

positioning the stage at a second position, different from the first position, wherein the first light is focused in a line upon a second selected line of the sample; and measuring, by at least one of the plurality of linear array detectors, an intensity as a function of time for the second light focused upon a second selected focal line of the sample.

9. The method of imaging the sample of claim 8, wherein the first selected position is translated approximately perpendicular to the direction of the focused line of the first light.

10. The method of imaging the sample of claim 8, further comprising acquiring an optical image of the sample from a digital image capture device separate from the confocal microscope, the optical image having a field of view larger than the sample.

11. The method of imaging the sample of claim 10, further comprising display of the optical image upon a display device in communication with a targeting computing device, the targeting computing device being adapted to receive vector targeting inputs from a user, wherein the vector targets correspond to a region of interest of the sample.

12. The method of imaging the sample of claim 11, wherein the targeting computing device is in communication with the stage and wherein the stage is further adapted to:
    receive the vector targets from the targeting computing device; and
    position the sample such that the first light is focused in a line within the region of interest of the sample.

13. The confocal microscope of claim 3, wherein the light source comprises a single laser source.

14. The confocal microscope of claim 3, wherein the stage physically translates the sample with respect to the focused line of the first light upon the sample without movement of the first light.

15. The confocal microscope of claim 3, wherein the optical system further comprises:
    a first beam splitter positioned to reflect the second light fluorescently emitted from the sample onto a first linear detector array of the plurality of linear detector arrays; and a second beam splitter positioned to reflect second light reflected from the sample onto a second linear detector array of the plurality of linear detector arrays.

16. The confocal microscope of claim 15, wherein the second light fluorescently emitted from the sample possesses a wavelength different from that of the first light and wherein the second light reflected from the sample possesses a wavelength of the first light.

17. The confocal microscope of claim 15, wherein a path between the second light fluorescently emitted from the sample and the first linear detector array is different from a path between the second light reflected from the sample and the second linear detector array.

* * * * *